Sept. 19, 1967
S. K. CLARK
3,342,236
SELF-LOCKING BOLT
Filed March 7, 1966
2 Sheets-Sheet 1
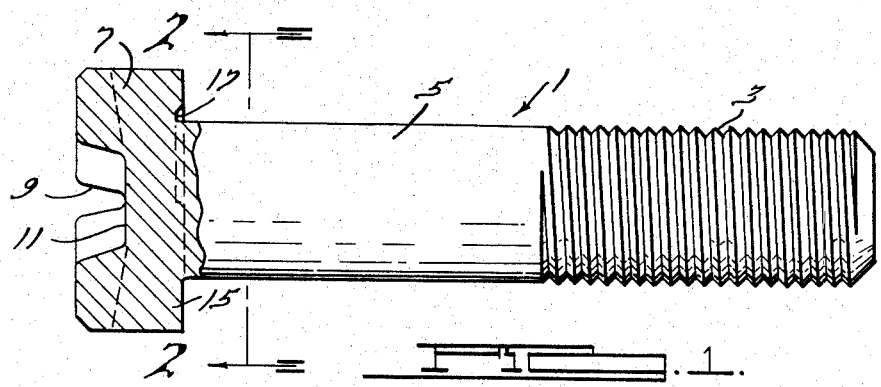
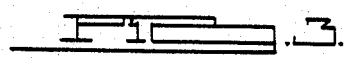
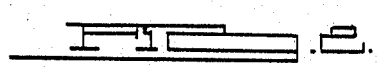
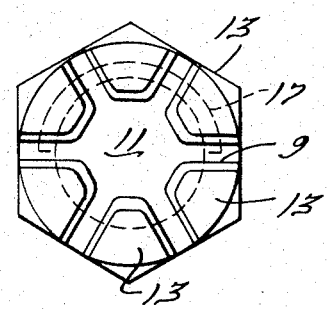
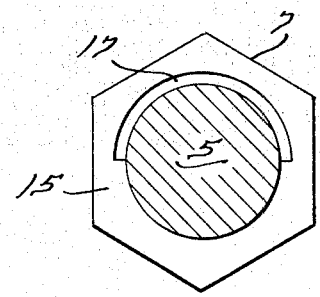
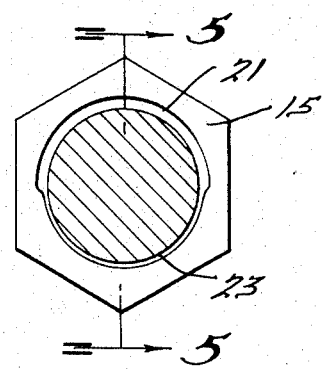
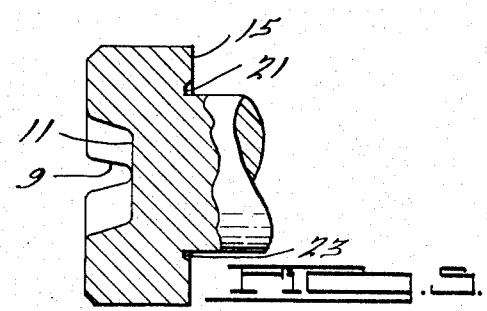
INVENTOR.
Samuel K. Clark.
BY
Harness, Dickey & Pierce.
ATTORNEYS

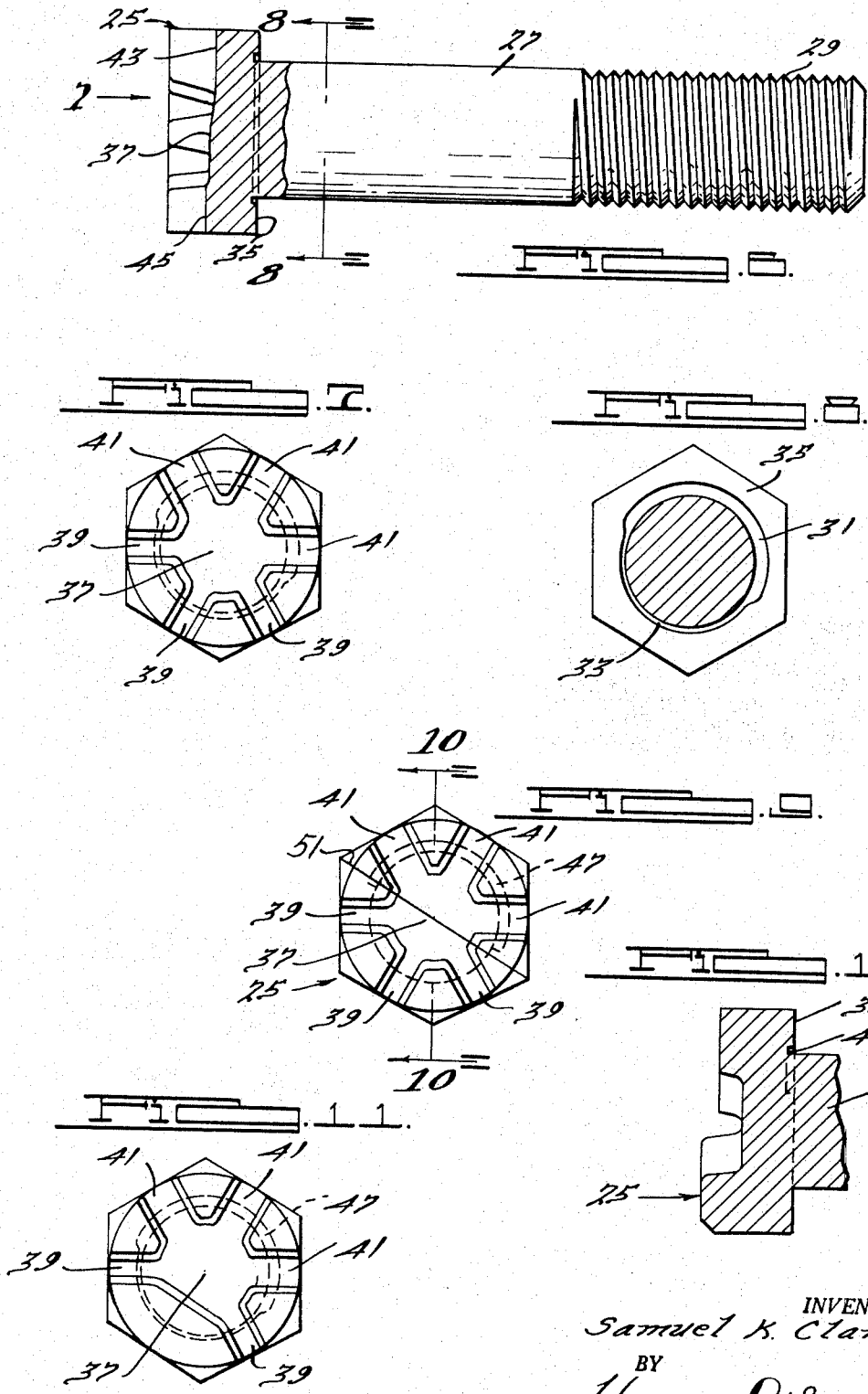

United States Patent Office 3,342,236
Patented Sept. 19, 1967

3,342,236
SELF-LOCKING BOLT
Samuel K. Clark, Ann Arbor, Mich., assignor to
Isabel Place, Beverly Hills, Calif.
Filed Mar. 7, 1966, Ser. No. 536,552
14 Claims. (Cl. 151—38)

This application is a continuation-in-part of application Ser. No. 364,359, filed Apr. 28, 1964, now abandoned, which in turn was a continuation of application Ser. No. 92,027, filed Feb. 27, 1961, now abandoned, which in turn was a continuation-in-part of application Ser. No. 55,757, filed Sept. 13, 1960, now abandoned.

This invention relates to headed fasteners such as bolts, cap screws, and the like (hereinafter referred to as "bolts") and, in particular, refers to the heads of such elements.

In assemblies, such as automobile engines, wherein the component parts are subject to vibration and shock it is desirable to utilize a locking means with the bolts or fasteners to prevent loosening. The most desirable method of doing this is to incorporate the locking means in the bolt itself (i.e., to make it "self-locking" as distinct from the use of a lock-washer), and foremost among the self-locking bolts is the well known and extensively used "Place" bolt as disclosed and claimed in U.S. Patent No. 2,543,705 of Charles E. S. Place. As disclosed and claimed in the Place patent the head of the bolt is made elastically movable by providing its upper face with several slots or grooves and its bottom face with an annular recess. These are symmetrically arranged with respect to the axis of the bolt, and provide enough elasticity in the head of the bolt so that it will act as a spring when the bolt is threaded into place. The pressure or force exerted by this "spring" will act to prevent loosening of the bolt under various adverse conditions. The specific bolt has proved to be enormously successful and there are many millions of them in actual use as standard parts of various well known automobiles.

It is the purpose of the present invention to increase the capacity of the head of a bolt, and in particular the head of the aforementioned Place bolt, to store elastic energy and thus to increase its self-locking characteristics.

It is also an object of this invention to increase the elasticity or self-locking characteristics of the head of a bolt by means of a structural feature which can be economically produced in the bolt on a mass production basis.

It is also an object of the invention to increase the self-locking capacity of a bolt by a structural feature which will not mar mating surfaces, reduce wrenching area, or have other disadvantageous characteristics.

The invention accomplishes the foregoing and other objects by fashioning the head of the bolt in a non-symmetrical manner with respect to the axis of the bolt. There is more material on one side of the bolt head than on the other. This is done in such a way as not to interfere with the surfaces employed for wrenching.

When the bolt head is made non-symmetrical in accordance with the principle of this invention, the axial load in the bolt upon tightening will tend to produce differential bending in the bolt head due to the eccentric condition that makes one side of the head less resistant to deformation under axial load in the bolt than the other side. This tendency toward or slight actual bending in the bolt head constitutes an extremely efficient way to store energy and introduce elasticity into the bolt and thus to enhance the self-locking characteristics of the bolt.

The invention is illustrated in the accompanying drawings in which:

FIGURE 1 is a side elevation, partly in section, of one form of the improved bolt;

FIG. 2 is a cross sectional view along the line 2—2 of FIG. 1;

FIG. 3 is an end view of the head of the bolt;

FIG. 4 is a section similar to FIG. 2 of a modification;

FIG. 5 is a section on line 5—5 of FIG. 4;

FIG. 6 is a side elevation of a modified bolt with the head partly in section;

FIG. 7 is a view taken from position 7 in FIG. 6;

FIG. 8 is a cross section along the line 8—8 of FIG. 6;

FIG. 9 is a view similar to FIG. 7 of a modified form;

FIG. 10 is a cross section along the line 10—10 of FIG. 9; and

FIG. 11 is a view similar to to FIG. 7 of another modification.

The bolt 1 is preferably formed of suitable heat treatable steel and comprises a threaded section 3, a circular shank 5, and a hexagonal head 7 having six flat sides to receive a wrench or other torque applying tool. The head is preferably shaped in accordance with the teaching of the aforementioned Place U.S. Patent No. 2,543,705 and can be formed by means of a modified form of the apparatus disclosed in U.S. Patent No. 2,716,759. Thus, the head 7 has three, equally spaced, diametrical tapered slots 9 extending to a depth of preferably ⅓ to ½ the height of the bolt but the center section of the bolt head is relieved to form a recess 11. The slots divide the head into a series of six segments 13 and weaken it so that it will tend to elastically deflect under axial load and act as a diaphragm or spring to lock the bolt against loosening.

In accordance with the aforementioned patent there would be a circular constant width groove at the juncture of the shank 5 and the bottom face 15 of the bolt head 7. However, in accordance with the embodiment of FIGS. 1–3 such a groove is replaced by one that is not a complete circle and which is preferably a semi-circle 17 as can be seen in the drawings. The recess 17 is preferably at least the same width as now used on the various bolts of this type and preferably at least the same depth. More desirably, the width of the recess 17 is twice that now used and, since it is a semi-circle, this will result in a total bearing surface area of face 15 which is the same as Place bolts now having a circular groove of one-half width. Thus, the unit load on the surface mating with face 15 is not increased.

When the bolt is threaded into place the forces on the bolt head will cause it to diaphragm or flex upwardly relative to the shank, this being enhanced by the aforementioned slots 9 and recess 11. In previous bolt construction this tendency to bend upwardly was substantially uniform around the axis of the bolt. However, by making the bolt nonsymmetrical through the use of a semi-circular groove 17 on only one side of the bolt (or other means such as hereinafter indicated), that particular side of the bolt is somewhat weaker than the other and there will now be a tendency for the weaker side of the head of the bolt to bend. Such differential bending between opposite halves of the bolts as defined by an axial midplane (or tendency to bend, since in actual practice the movement will be extremely small) will absorb considerable elastic energy and enable the head to be even more resiliently resistant to loosening of the threaded portion of the bolt.

It is within the purview of the invention to use an annular recess of different widths or depths so as to result in non-symmetrical loading of the bolt head. Thus, in the preferred groove arrangement of FIGURES 4 and 5 there is a semi-circular groove 21 which is preferably about one and one-half times as wide as the groove now being used on the commercial Place bolt and this blends into a semi-circular groove 23 which is preferably about one-half the size of the standard groove now being used.

With this relationship, a bearing area on face 15 is maintained which is substantially the same as on conventional bolts, but the benefit of bending due to non-symmetrical loading will be obtained. This particular form has the advantage of relieving or providing clearance at the corner between the shank and the underside 15 of the head so that the entire face 15 can readily engage the surface against which the bolt is being tightened. It also has the advantage as does half groove 17 of making the center of pressure or area on each side of the head a different distance from the axis thereby increasing the eccentric condition obtained from different masses of metal in each half.

In the form of FIGURES 4 and 5 the two grooved sections may be of the same depth as illustrated or they may be different depths. Alternately, the two sections could be of the same widths but one section deeper than the other.

Referring to the species of FIGS. 6–8, the bolt illustrated is seen to comprise a hexagonal head section 25, a circular shank section 27, and a threaded section 29. At the juncture between the head 25 and the shank 27 there is an annular groove which consists of a semi-circular section 31 and a semi-circular section 33, the section 31 being approximately twice as wide as the sectioin 33. The surface 35 on the bottom of the head 25 forms the bearing surface which presses against a part to be tightened when the section 29 is threaded into place.

The top of the head 25 is provided with a central depression or a recess 37. Opening radially into the recess 37 are two sets of axially extending slots which divide the top of the head into segments as in FIG. 3, the slots in one set being smaller than the slots in the other. Thus, there is a narrow set of slots 39 and a wider set of slots 41. This slot construction is similar to that set forth in the aforementioned Place patent and the bolts of FIGS. 1–5 with the exception that in the other bolts the slots are all of uniform width. The slots 39 and 41 are preferably tapered as indicated in order to facilitate their manufacture on bolt heading equipment. The large slots 41 are preferably angular disposed so they are in axial alignment with the large portion of the bottom face groove 31, whereas the smaller slots 39 are in alignment with the small groove section 33. The large slots 41 are preferably about 50% larger than the usual slots on Place bolts and the small slots 39 are preferably about 50% smaller than the standard slots.

It will be seen from the foregoing arrangement that there is substantially more metal in the half of the bolt head that is axially aligned with the small grove section 33 and consequently this side of the bolt head will have more resistance to bending than will the other side. Consequently, when the bolt is tightened up and forces are placed on the bearing face 35 the side of the bolt head represented by the groove section 31 and the large slots 41 will be more highly stressed or have less resistance to bending and therefore tend to bend in a resilient manner more than the other side and will absorb elastic energy and enhance the self-locking characteristics of the bolt. This tendency to bend will be superimposed upon the diaphragming action caused by the slots and hence will add to the locking action of the head.

The foregoing action can be increased still further by making the slots 41 of somewhat greater depth than the slots 39 as seen by comparing the bottom 43 of slot 41 with the bottom 45 of the slots 39 in FIG. 6. This also can be done in lieu of making the slots of unequal width.

FIGURES 9 and 10 show a modification in which the groove 47 on the bottom face 35 extends around only one-half of the circumferential corner between the face 35 and the shank 27, the other half of the corner being solid or containing no grooves. Further weakening of the half of the head indicated at 51 is obtained by making it thinner than the other half, this principle being applicable to other heads shown herein or to conventional bolt heads and utilizing in effect a slot that is about half the area of the head. This idea of differential head thickness in the two halfs can also be used with the other underface grooves shown herein or no groove.

FIGURE 11 illustrates another modification in which one of the slots 39 is omitted so that there are two small slots 39 and three large slots 41. The large slots 41 are in axial alignment with the half slot 47.

While the non-symmetrical slot arrangements are preferably used with a non-symmetrical groove on the bottom face, it is evident that they may be used advantageously with a symmetrical groove or no groove on face 35.

It is to be observed that from the standpoint of the geometry of the outside of the bolt head, the heads shown herein are symmetrical with respect to the geometric axis of the shank. That is, the heads are concentrically located on the shank. The bolt is rotated about the geometric axis when threaded into a hole. However, the non-symmetrical arrangement of metal in the head displaces the centroids of various head cross sections so that the central polar axis (normal line through the centroids) of the head is displaced from the geometric axis. Thus, a new form of elastic action is obtained when the bolt is loaded wherein the stressing and bending resistance of the two sides of the head is different to cause a tendency toward energy absorbing differential bending of opposite sides of the head.

It may be noted that another way to displace the central polar axis of a Place bolt is by offsetting the center of the Place slot and recess pattern so that it is nonconcentric with the geometric axis of the head, e.g., moving the center of recess 11 off the center of the head.

While several forms of the invention have been illustrated it will be obvious that it is possible to use other specific structures without departing from the spirit and scope of the invention. For example, as already indicated it is possible to obtain some improvement in self-locking by use of the underface recesses herein disclosed in bolts that do not have the head configuration revealed in the aforementioned Place patent, such as cap screws. It is preferred to use the Place structure because the flexibility of the head structure is peculiarly adapted to the bending deformation introduced by the recesses herein disclosed. The word "bolt" includes various types of headed fasteners in which elastic diaphragming or distortion of the head is desired.

I claim:
1. A self-locking bolt or the like comprising a head and a shank, said shank being coaxial with the head and of circular cross section at its juncture with the head, said head having a bottom face providing a bearing surface lying perpendicular to the axis of the bolt, said bottom face having a substantially semi-circular recess therein and extending axially a substantial distance into the head at the juncture of said bottom face with the shank and serving to unbalance the head so that one side of said bolt provides a susbtantially different resistance to bending under axial load than the other side.

2. A self-locking bolt or the like comprising a head and a shank, said shank being coaxial with the head and of circular cross section at its juncture with the head, said head having a bottom face providing a bearing surface lying perpendicular to the axis of the bolt, said bottom face having an annular recess therein at the juncture of said bottom face with the shank, substantially one half of the circumferential extent of said recess having a first cross section and the remainder of said recess having a second cross section which is substantially different in size than said first cross section so that one side of said bolt provides a substantially different resistance to bending under axial load than the other side.

3. A bolt as set forth in claim 2 wherein the top of said bolt head comprises a first portion and a second portion, said first portion being spaced a substantially greater distance from said bearing surface than said second portion whereby the head in the first portion is substantially thicker than in the second portion, each of said portions being asymmetric with respect to the axis of the bolt and the center of area of each being displaced substantially from said axis, said portions providing substantially different resistances to bending under axial load on the bolt.

4. A bolt as set forth in claim 2 wherein said first cross section has a first depth and said second cross section has a second depth substantially different than the first.

5. A bolt as set forth in claim 2 wherein said first cross section has a first width and said second cross section has a second width substantially different than the first.

6. A self-locking bolt or the like comprising a head and a shank, said shank being coaxial with the head and of circular cross section at its juncture with the head, said head having a bottom face providing a bearing surface lying perpendicular to the axis of the bolt, said bottom face having an annular recess therein at the juncture of said bottom face with the shank, the inner periphery of said recess being of substantially the same diameter as the diameter of the shank, substantially one half of the circumferential extent of the outer periphery of said recess being of a first diameter and the remainder of said outer periphery being of a second diameter which is substantially different than said first diameter so that one side of said bolt provides a substantially different resistance to bending under axial load than the other side.

7. A self-locking bolt or the like comprising a head and a shank, said shank being coaxial with the head and of circular cross section at its juncture with the head, said head having a bottom face providing an annular bearing surface lying perpendicular to the axis of the bolt, said bottom face having a recess therein at its juncture with the shank, the top face of said head having an internal depression and a plurality of slots extending radially from the depression to open out of the sides of the head, said depression and slots extending axially into the head to a substantial depth and dividing the top of said head into a plurality of radially extending tapering segments, said depression having a midpoint displaced a substantial distance from the axis of the bolt so that the pattern of depression and slots is asymmetric with respect to said axis and has a geometric axis spaced substantially from the axis of the head and shank.

8. A self-locking bolt or the like comprising a head and a shank, said shank being coaxial with the head and of circular cross section at its juncture with the head, said head having a bottom face providing an annular bearing surface lying perpendicular to the axis of the bolt, said bottom face having a recess therein at its juncture with the shank, the top face of said head having a centrally located depression and a plurality of slots extending radially from the depression to open out of the sides of the head, said depression and slots extending axially into the head to a substantial depth and dividing the top of said head into a plurality of radially extending tapering segments, slots on one side of an axial midplane through the head having a first cross section and slots on the other side of such midplane having a second cross section which is substantially different in size so that one side of said bolt provides a substantially different resistance to bending under axial head than the other side.

9. A self-locking bolt or the like comprising a head and a shank, said shank being coaxial with the head and of circular cross section at its juncture with the head, said head having a bottom face providing an annular bearing surface lying perpendicular to the axis of the bolt, said bottom face having a recess therein at its juncture with the shank, said head having flat outer sides lying in planes parallel to said axis and providing wrench receiving means for torquing of the bolt, the top of said head comprising a first half area on one side of a midplane through the axis of the bolt extending to said flat sides and a second half area on the other side of said axial midplane extending to said flat sides, both areas being substantially parallel to said bottom face and said first area being spaced a substantially greater distance from said bearing surface than said second area whereby the head in said first area is substantially thicker than the head in said second area, the centers of said areas each being displaced substantially from the axis of the bolt whereby the portions of the head defined by said areas provide different resistances to bending due to load on the head.

10. A self-locking wrench-head bolt or the like comprising a head and a shank, said shank being coaxial with the head and of circular cross section at its juncture with the head, said head having a bottom face providing a bearing surface lying perpendicular to the axis of the bolt, said bottom face having a recess therein at the junction of said bottom face with said shank, said head having flat outer sides lying in planes parallel to the axis of the bolt and providing wrench receiving means for torquing of the bolt, said head being elastically deformable substantially as a diaphragm relative to the shank when the bolt is subject to normal axial load due to torquing and such deformation providing self-locking of the bolt, and means in the head to unbalance it in bending under said axial load comprising variable head sections providing one half of the head on one side of an axial midplane through the head with a substantially different structure than the other half of the head and with a substantially greater resistance to said elastic deformation under normal axial load on the bolt than the other half of the head whereby the resulting tendency of the two halves of the head to differential deformation under axial load absorbs elastic energy.

11. A self-locking bolt or the like comprising a head and a shank, said shank being of circular cross section at its juncture with the head, said head having a bottom face providing an annular bearing surface lying perpendicular to the axis of the bolt, said bottom face having a recess therein at the junction of said bottom face with said shank, said head having an outer periphery including flat sides for receiving a wrench means to apply torque to the bolt, said outer periphery and said shank having a common geometric axis, said head being capable of substantial elastic deformation substantially as a diaphragm upon application of normal operative axial load upon application of torque to tighten said bolt and such deformation providing self-locking of the bolt, said head being asymmetrically shaped with respect to said geometric axis and having a greater mass in one half of the head on one side of an axial midplane than in the other half on the other side of such midplane to provide said head with an axis of resistance to axial load on the bolt which axis is laterally displaced substantially from said geometric axis so that one side of said head tends to bend relative to the other and absorb elastic energy when the head elastically deforms substantially as a diaphragm.

12. A self-locking bolt or the like comprising a head and a shank, said shank being coaxial with the head and of circular cross section at its juncture with the head, said head having a bottom face providing a bearing surface lying perpendicular to the axis of the bolt, the top of said head being asymmetrically shaped with respect to the axis of the bolt to provide a first half of said head on one side of an axial midplane with substantially greater resistance to bending than the second half of said head on the other side of said midplane, said head having groove means in said bottom face extending axially into the head for a substantial depth and extending through a perimeter of at least substantially a semi-circle, said groove means being asymmetrically shaped with respect to the axis of the bolt to provide one half of said head on one side of an axial midplane with a substantially greater resistance to bending than the other half of said head on the other side of said midplane.

13. A bolt as claimed in claim 12 wherein said groove means comprises an annular recess having one half of its circumferential extent of a first cross section and the remainder of a second cross section which is substantially different in size than the first.

14. A bolt as claimed in claim 12 wherein said first half and said one half of said head are in axial alignment.

References Cited

UNITED STATES PATENTS

| | | | |
|---|---|---|---|
| 2,343,662 | 3/1944 | Goff | 85—9 |
| 2,362,999 | 11/1944 | Hewitt | 85—9 |
| 2,694,800 | 11/1954 | Sunderhauf | 85—9 |
| 2,770,998 | 11/1956 | Schwartz | 85—45 |

FOREIGN PATENTS

| | | |
|---|---|---|
| 567,885 | 6/1958 | Belgium. |
| 357,468 | 9/1931 | Great Britain. |
| 770 of 1888 | 1/1888 | Great Britain. |
| 1,090,665 | 10/1954 | France. |
| 1,183,518 | 1/1959 | France. |
| 445,433 | 2/1949 | Italy. |
| 544,260 | 6/1956 | Italy. |

EDWARD C. ALLEN, *Primary Examiner.*

CARL W. TOMLIN, *Examiner.*

M. PARSONS, JR., *Assistant Examiner.*